July 25, 1961  A. J. GAREY  2,993,448
SHAFT ADJUSTING AND TESTING MECHANISM
Filed Aug. 26, 1957  4 Sheets-Sheet 1

INVENTOR.
ALBERT J. GAREY
BY Flam and Flam
ATTORNEYS.

July 25, 1961 A. J. GAREY 2,993,448
SHAFT ADJUSTING AND TESTING MECHANISM
Filed Aug. 26, 1957 4 Sheets-Sheet 2
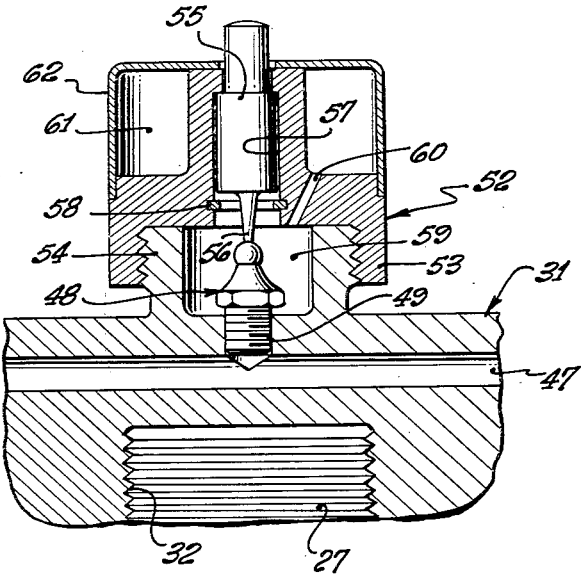
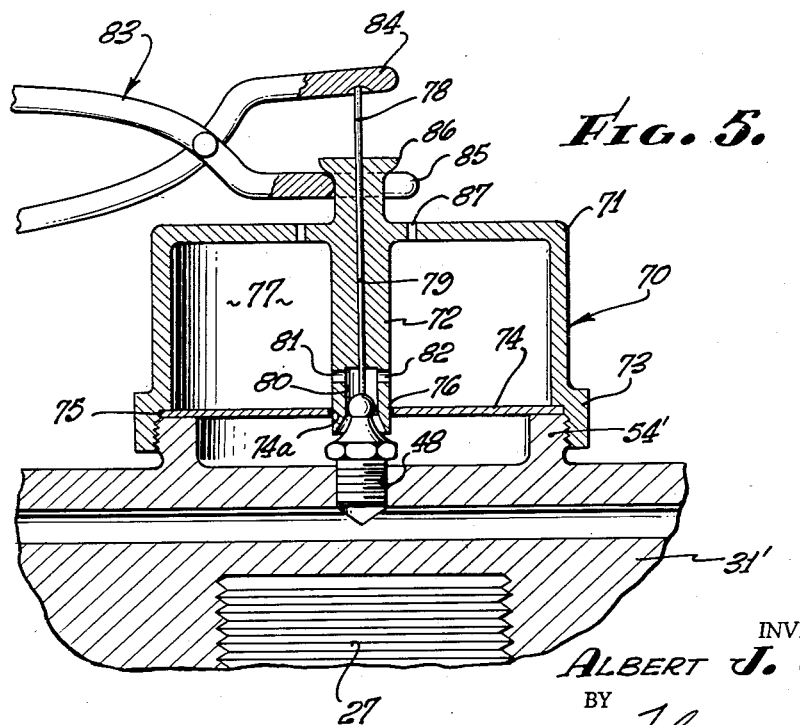
INVENTOR.
ALBERT J. GAREY,
BY
Flam and Flam
ATTORNEYS.

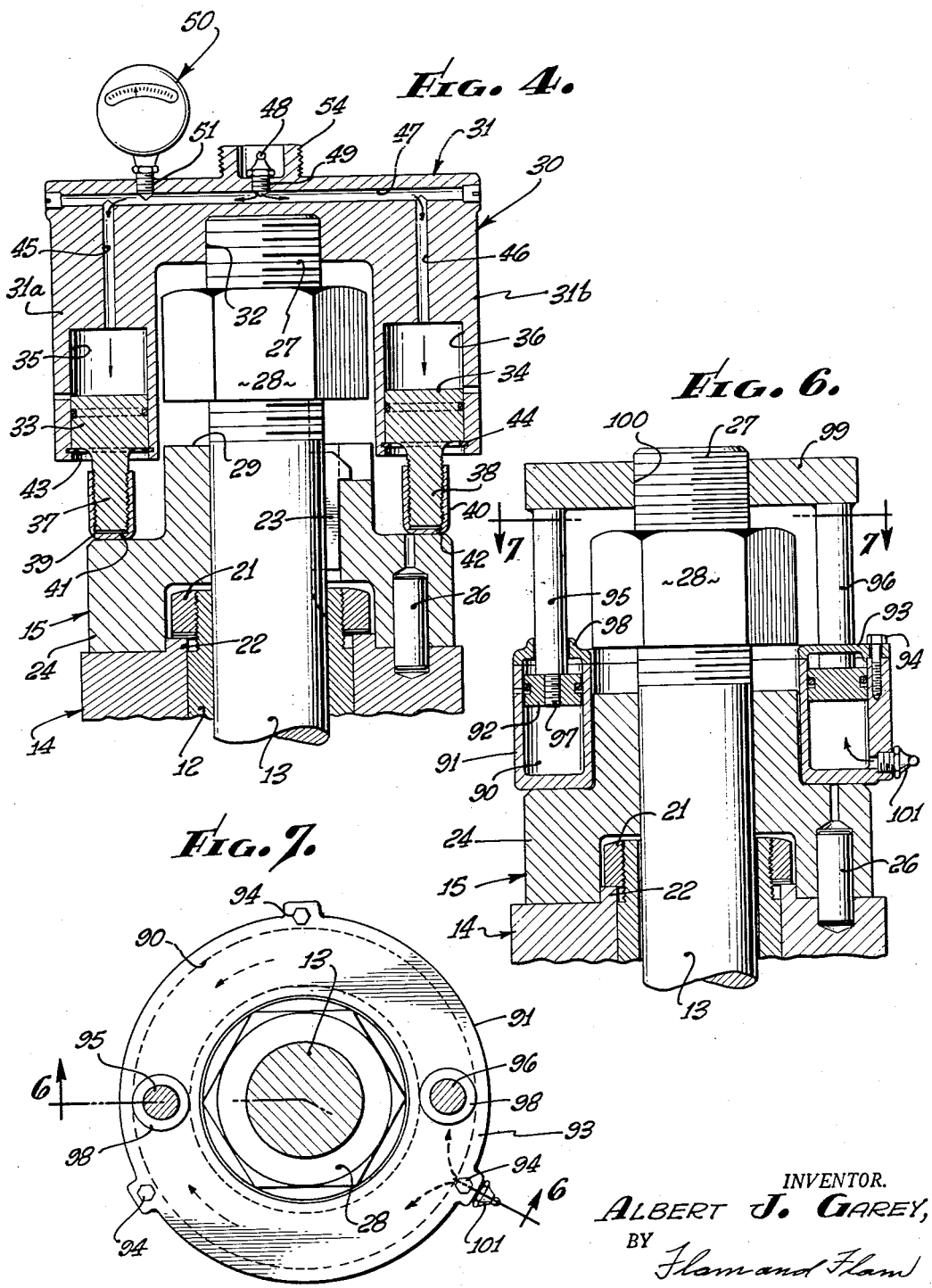

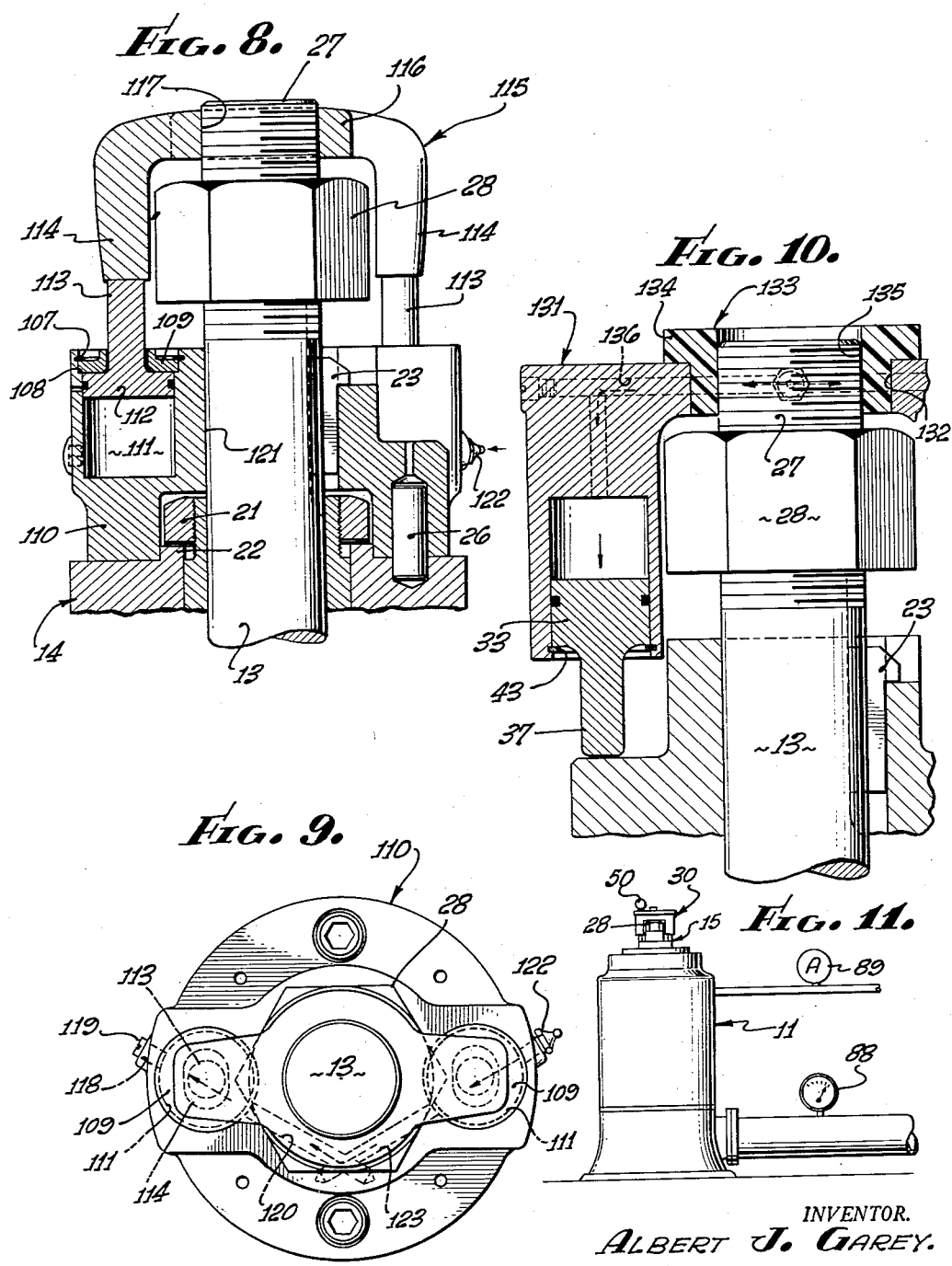

United States Patent Office 2,993,448
Patented July 25, 1961

2,993,448
SHAFT ADJUSTING AND TESTING MECHANISM
Albert J. Garey, Los Angeles, Calif., assignor to U.S. Electrical Motors, Inc., Los Angeles, Calif., a corporation of California
Filed Aug. 26, 1957, Ser. No. 680,205
19 Claims. (Cl. 103—83)

This invention relates to axially loaded shafts that require axial adjustment.

For example, a vertical pump runner or head shaft may require axial adjustment to ensure optimum operation of the pump. Commonly, the head shaft carries an adjusting nut that rests upon rotary structure to which the head shaft is splined or keyed. The rotary structure forms the drive from the rotor of an electric motor to the head shaft. Since the axial load may be substantial due to the weight of the shaft and of the pump runner mounted on it, rotation of the nut is resisted by substantial frictional forces acting both at the threads and at the seat for the nut. The seat may furthermore be mutilated as the sharp edges of the nut move angularly during this adjustment.

In an application Serial No. 598,016, filed July 16, 1956, now Pat. No. 2,964,015, entitled "Shaft Adjusting Mechanism," and in the name of Albert J. Garey, there is illustrated a fluid operated device for temporarily relieving the nut from the load, whereby the nut is lifted from the seat and can be readily manipulated. One object of the present invention is to provide improved apparatus of such character.

Another object of this invention is to provide a removable attachment for accomplishing these functions and that has provisions for use with head shafts of various sizes.

Another object of this invention is to provide simple apparatus whereby the position of the shaft for optimum operation may be accurately determined so that trial and error are virtually eliminated. For this purpose, the device is so designed that the position of the shaft and pump impellers can, by hydraulic or pneumatic means, be adjusted while the shaft and pump are rotating. The optimum position is thereby readily determined. The shaft is stopped, the nut moved into engagement with the seat, and the fluid operated device is then released for transfer of load to the nut. The fluid operated device is so designed that while rotating with the shaft, fluid may be admitted or released.

Another object of this invention is to provide in a simple manner for the collection of fluid released from the device.

Still another object of this invention is to provide a device of this character whereby the downthrust on the head shaft is readily measured.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 3 is an enlarged fragmentary sectional view illustrating one form of a device that may be used to collect and confine the fluid medium which is used to transmit a lifting pressure upon the head shaft, and which is released from the lifting means when it is desired to lower the head shaft;

FIG. 4 is an enlarged sectional view illustrating the mechanism of FIG. 1;

FIG. 5 is a view similar to FIG. 3, illustrating a modified device for release and collection of fluid medium from the mechanism;

FIG. 6 is a fragmentary sectional view, taken along planes indicated by lines 6—6 of FIG. 7, and similar to FIG. 4, said FIG. 6 illustrating a modified mechanism;

FIG. 7 is a sectional view, taken along the plane indicated by line 7—7 of FIG. 6;

FIG. 8 is a view similar to FIGS. 4 and 6, illustrating a further modified mechanism;

FIG. 9 is a top plan view of the mechanism illustrated in FIG. 8;

FIG. 10 is a fragmentary sectional view similar to FIG. 8, showing a still further modified form of the present invention; and FIG. 11 is a diagrammatic view illustrating a motor-pump unit under test.

Figure 1:
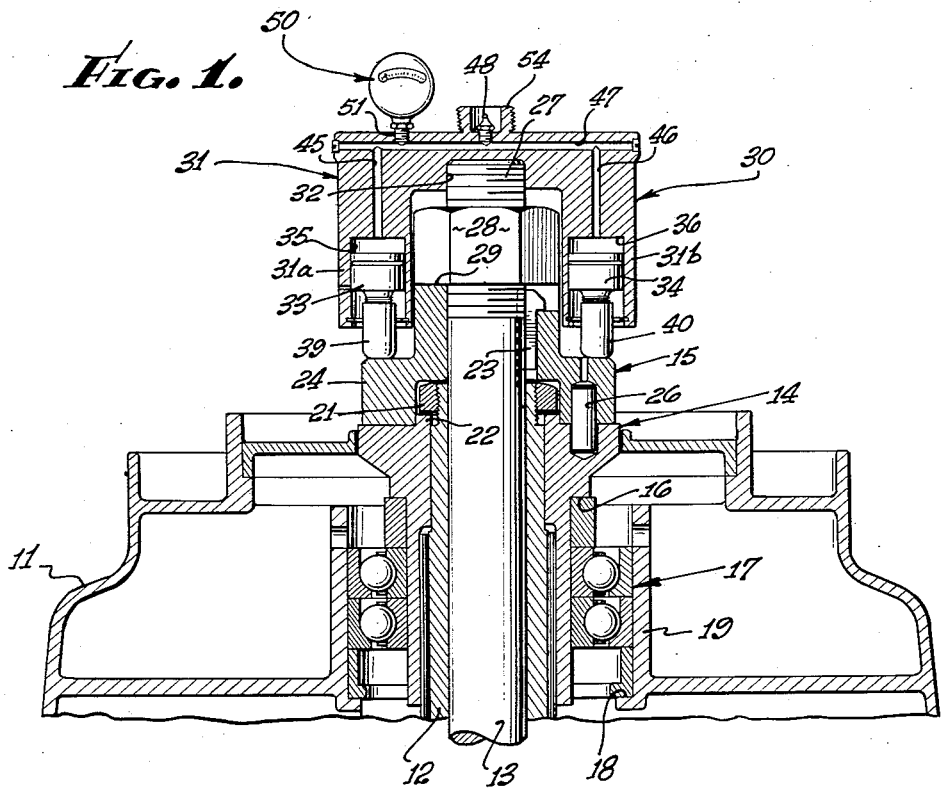
FIGURE 1 illustrates in longitudinal section a mechanism incorporating the present invention, the mechanism cooperating with a motor or the like, the upper fragmentary part of which is illustrated in longitudinal section.

In FIG. 1, a typical casing 11 is illustrated for a hollow shaft drive. A hollow shaft 12 may carry a rotor of a motor or gears whereby the hollow shaft 12 is rotated. A load or head shaft 13 for a pump, for example, telescopes through and extends upwardly beyond the hollow shaft 12.

The shafts 12 and 13 are rotatably connected by the aid of two coupling members 14 and 15 through which the shafts extend. The lower coupling member 14 has a peripheral shoulder 16 which rests upon stacked inner races of a thrust ballbearing structure 17. The outer races of the bearing structure 17 rest upon an internal annular shoulder 18 formed in a cup 19. The cup 19 is formed as a part of the casing 11.

The lower coupling member 14 is in driving relationship with the hollow shaft 12 by the aid of a key or other suitable structure. A nut 21, mounted at the upper end of the hollow shaft 12, cooperates with a raised annular seat 22 at the upper side of the coupling member 14 for adjusting the relative longitudinal position of the hollow shaft 12.

The upper coupling member 15 telescopes over that portion of the pump or head shaft 13 which projects upwardly beyond the hollow shaft 12. A key 23 rotatably couples the pump shaft 13 to the upper coupling member 15. This coupling member thus drives shaft 13.

The upper coupling member 15 has a lower flange 24. The opening of the coupling member 15 is enlarged at the lower end thereof for accommodating with clearance the adjusting nut 21 and the upper end of the hollow shaft 12. The flange 24 rests upon the upper portion of the lower coupling member 14 and fits the raised seat 22. A series of pins 26 establish a rotary connection between the coupling members.

For adjusting the pump shaft 13, an adjusting nut 28 similar to the nut 21 is provided. The lower surface of the adjusting nut 28 rests upon a seat formed by the upper surface 29 of the hub portion of the upper coupling member 15. The pump shaft 13 is thereby supported. The longitudinal position of the pump shaft 13 is determined by the position of the nut 28 along the threaded end 27 of the pump shaft 13.

The static load on the pump shaft 13 may be considerable, especially in a deep well. The frictional force resisting rotation of the nut 28 upon the threaded end 27 accordingly may be considerable. Also the frictional forces at the seat 29 may be considerable.

In order to provide for rotation of the nut 28 without these frictional restraints, a fluid operated mechanism 30 is provided for lifting the pump shaft 13. The mechanism 30 comprises a generally U-shaped support or cylinder block 31, the legs 31a and 31b of which extend in diametric relationship with respect to each other and downwardly along opposite sides of the pump shaft 13 and along opposite sides of the hub portion of the coupling member 15. The connecting portion or yoke of the support 31 provides a threaded socket 32 receiving the threaded end 27 of the pump shaft 13.

Pistons 33 and 34, guided for movement by downwardly opening cylinder spaces 35 and 36 formed in the ends of the legs 31a and 31b, are urged downwardly relative to the support 31 and against the flange 24 of the upper coupling member 15. Fluid or hydraulic pressure is caused to be applied in these spaces. Since the coupling member 15 is immovable in a longitudinal direction, the support 31 is itself thereby elevated. The pump shaft 13, connected to the support at the socket 32, is correspondingly elevated (FIG. 4). Accordingly, the load on the pump shaft 13 is transferred from the nut 28 to the support 31, and the nut 28 accordingly can be readily adjusted at this time. The nut 28 is accessible between the legs 31a and 31b for this purpose.

Upon release of fluid pressure, the bracket 31 moves downwardly and the nut 28 again engages the seat 29 and supports the shaft. The support 31 can now be removed.

The pistons 33 and 34 have downward reduced extensions or stems 37 and 38 upon which feet 39 and 40 are adjustably mounted for engagement with the flange 24 of the coupling member 15.

In the present form, the feet 39 and 40 comprise adjustable caps threadedly accommodated on correspondingly threaded portions of the extensions 37 and 38. In this way, simultaneous engagement of all of the piston structures with the flange 24 is obtained by appropriate angular movement of caps 39 and 40. Ports 41 and 42 in the bottom of the caps ensure against trapping air between the caps and the extensions.

Upward movement of the cylinder block 31 is limited by snap rings 43 and 44 engaging the lower surfaces of pistons 33, 34.

For supplying fluid under pressure to urge the pistons downwardly, the block 31 has passages or ports 45 and 46 extending upwardly from the cylinder spaces 35 and 36. These passages intersect respectively the ends of a diametric passage 47 in the support 31 which passes above the socket 32.

An "Alemite" or other suitable fitting 48, accommodated at an aperture 49 located axially of the support socket 32, serves as a means for controlled admission or withdrawal of a fluent medium, such as grease, through the passages 45, 46 and 47 and the cylinder spaces 35 and 36. The fitting 48 incorporates a check valve closure or the like for normally trapping the fluid.

A gauge 50 indicates the pressure of fluid. The gauge fits a threaded aperture 51 intersecting the diametric passage at one side.

In operation, the support cylinder block 31 is first threaded down upon the upper end of the pump shaft 13. The feet 39 and 40 are adjusted to ensure equal distribution of load between the pistons 33 and 34. A grease gun or other suitable device (not shown) engages the fitting 48, and fluid or grease under pressure is admitted. Since the connection between the gun and the fitting 48 is in the form of a surface of revolution and since the fitting 48 is located on the axis of rotation, this process of raising the shaft 13 may be accomplished even when the shaft is rotating. There would then be merely relative rotation between the upper ball of fitting 48 and the corresponding socket of the grease gun. The nut 28, lifted from the seat 29, is adjusted by a suitable tool or, for that matter, by hand.

When the grease is released from the system to lower shaft 13, desirably the grease is collected to prevent its spattering upon the operator or upon the motor parts. For this purpose, a fitting 52 (FIG. 3) is provided. This fitting has a flange 53 provided with interior threads that engage exterior threads of an annular flange 54. The flange 54 is formed on the support 31 and surrounds the fitting 48. The fitting 52 guidingly mounts a plunger 55 that has a reduced stem portion 56 engageable at its lower end with the check closure of the fitting 48. The upper end of the plunger 55 projects beyond the fitting 52 for appropriate actuation, as exertion of manual pressure. The bore 57 of the fitting 52 is reduced at its upper end, whereby a shoulder is formed for limiting upward movement of the plunger 55. A snap ring 58 limits downward movement of the plunger 57.

When the plunger 57 is depressed, grease or other fluid enters the space 59 surrounded by the flange 54. It passes via an outwardly opening port 60 in the fitting from the space 59 to an annular chamber 61 provided by a cup 62. The cup is removably secured to the upper end of the fitting by frictionally engaging the periphery of the fitting flange 53. The cup 62 is centrally apertured for passage of the plunger 57. A stop is formed by a slightly enlarged portion of the flange 54 whereby the normal position of the cup 62 is determined.

In FIG. 5, a slightly different grease or fluid collecting fitting 70 is provided. The fitting 70 comprises a cup portion 71 integrally joined to a stem portion 72 that extends axially on opposite sides of the bottom of the cup 71. The cup has an enlarged flange 73, by the aid of which the fitting 70 is secured to the support 31'.

A disk 74, centrally ported at 74a, fits with slight clearance upon the end of the stem 72. The marginal portions of the disk 74 are clamped against a shoulder 75 formed by the enlarged flange 73 when the cup 71 is secured to the annular flange 54' of the casing 31'. This disk 74 forms with the cup 71 an annular space 77 in which grease or other fluid released from the mechanism is collected. An elongate rod 78, guidingly accommodated in a through bore 79 in the stem 72, serves as a means for opening the check closure of the fitting 48.

The grease passes upwardly from the fitting 48 into an enlarged lower end 80 in the stem 72 and thence to the annular space 77 via diametric ports 81 and 82.

For actuating the rod 78, a pivoted hand-operated tool, having nose pieces 84 and 85 relatively movable toward each other, is provided. One nose piece 85 is journaled upon the upper end of the stem 78 by passage of the upper end of the stem 78 through a circular opening in the nose piece 85. The upper end of the stem 72 is peened over, as at 86, to hold the tool 83 in place. The other nose piece 84 of the tool 83 engages the upper end of the rod 78. Accordingly, by appropriate manipulation of the tool 83, the rod 78 is urged downwardly to open the fitting 48. Since the opening in the lower nose piece is circular, the tool may be grasped and manipulated even during rotation of the cup 70. Ports 87 near the center of the cup ensure against air being trapped in the annular space 77 as grease or other fluid enters. Furthermore, ejection of grease through the ports 87 indicates that the cup 71 is full. This is especially useful when the grease is released while the shaft 13 is rotating. Under such circumstances, the grease would be thrown out by centrifugal force against the cup 71 and deposited as a layer on the internal cylindrical surface thereof. The capacity of the space 77 may correspond to the combined capacity of the cylinder spaces 35 and 36.

In the form illustrated in FIGS. 1 to 4, the static load on the pump shaft 13, if desired, can be measured by the pressure gauge 50. The pressure of fluid in the system corresponds directly to the static load, and the gauge may read directly in units of force.

When the shafts are rotated under power, the reaction due to the pump impellers will create an additional hydraulic down thrust upon the shaft 13. The shaft tends to lengthen due to the additional hydraulic down thrust caused by the column of water being pumped to the surface. This creates a tension force. The total static and hydraulic down thrust can be determined by the gauge 50. For this purpose, the gauge 50 may be of the maximum indication type. Optionally, a stroboscopic light may be used for reading the gauge while the parts are rotating. The hydraulic down thrust is readily calculated as the difference between the indication of the gauge for dynamic conditions less the indication of the gauge for static conditions.

During rotation of the apparatus, the shaft 13 may be raised or lowered. The optimum position of the shaft 13 can be determined by reading a pressure gauge 88 (FIG. 11) at the pump outlet and/or by reading an electrical meter 89 measuring the power delivered by the motor.

The process of adjustment includes, first, while shaft 13 is not rotating, adjusting the shaft until the pump runners just clear the pump bowl. This adjustment permits drive shaft 13 to carry its own weight as well as the pump runner weight and in so doing will stretch or elongate proportional to the characteristics of the shaft material, the physical dimensions and total length and weight. The adjusting nut 28 is then lowered to the load carrying coupling 15 at the surface 29. This provides a fix point as well as a safety measure to prevent the shaft 13 from lowering beyond this point. Additional hydraulic pressure is then applied, raising shaft 13 and thereby over-adjusting the pump runners beyond the desired and most efficient point. Then, while the shaft 13 is rotating, that is, while the shaft is elongated even further beyond its static stretch due to the additional hydraulic load applied by the pump, the optimum position is attained as above outlined. This takes into account the variables of shaft stretch not possible with static adjustments. The mechanism is stopped and the nut 28 lowered so as to rest on surface 29. The support 31 is then removed. No stop-and-start, trial-and-error testing is required.

In the form illustrated in FIGS. 6 and 7, an annular cylinder arrangement is provided. The annular cylinder space 90 is formed by an annular block 91 that rests upon the flange 24 of the coupling member 15. This block provides an upwardly opening annular space in which an annular piston 92 is accommodated. A generally circular cover closure 93 is clamped to the block 91 by a series of cap screws 94. Two piston rods 95 and 96 are secured to diametrically opposite portions of the annular piston 92. For this purpose, the rods 95 and 96 have threaded reduced extensions 97 engaging appropriate apertures in the piston 92. Appropriate bosses 98 formed on the cover 93 permit passage of the rods 95 and 96.

A strap 99 having ends connected to the rods has a centrally threaded bore 100 in which the upper threaded end 27 of the pump shaft 13 is received.

Upon application of fluid under pressure beneath the piston 92, the pump shaft 13 is elevated. For this purpose, a fitting 101 is provided at the outer lower portion of the block 91.

In the form illustrated in FIGS. 8 and 9, the lifting mechanism is incorporated in the upper coupling member 110. The coupling member 110 provides two upwardly opening cylinder members. The spaces accommodate circular pistons 112. Rods 113, integrally joined to the pistons 112, project upwardly beyond the cylinder spaces 111 and engage the lower surfaces of arms 114 of a yoke 115.

In the upper ends of the cylinder spaces 111 there are provided piston guides 109 with which the rods 113 cooperate. The guides 109 are held against shoulders 108 formed by enlargements at the outer ends of the cylinder spaces. Snap rings 107 hold the guides 109 in place.

The yoke 115 has a central hub portion 116 provided with a threaded aperture 117 for cooperation with the upper threaded end 27 of the pump shaft 13.

The coupling member 110 is provided with a bore extending substantially diametrically on opposite sides of the left-hand cylinder space 111. At the outer end, the bore forms a drain passage 118. A plug 119 normally closes the drain outlet. The inner end of the bore forms a passage or port 120 which extends on one side of the central aperture 121 of the coupling member 110.

A bore is provided for the right-hand cylinder space 111 in a similar fashion. The outer end of the bore is threaded for cooperation with a fitting 122 for controlled admission and withdrawal of fluid into the right-hand cylinder space. The inner end of the bore provides a passage or port 123 which intersects the passage 120. Accordingly, communication is established between the two cylinder spaces, and fluid is simultaneously admitted under pressure to both cylinder spaces 111.

Figure 2:
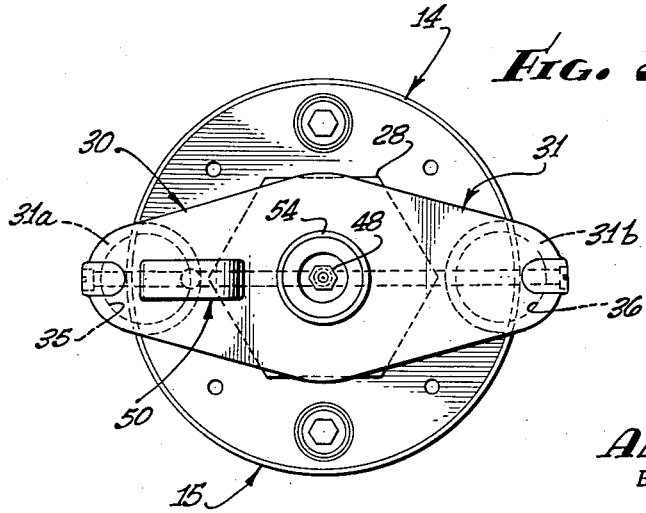
FIG. 2 is an enlarged top plan view of the mechanism shown in FIG. 1.

In the form shown in FIG. 10, a support 131 is provided that is similar to the support 31 illustrated in the form shown in FIGS. 1, 2 and 4. The support 131 has a centrally located hexagonal or other non-circular recess 132 in which an adapter nut 133 is accommodated. The adapter nut has a peripheral flange 134 resting upon the edges about the upper end of the support aperture 132. The adapter nut 133 provides a threaded opening 135 with which the threads to the upper end 27 of the pump shaft 13 cooperate.

As the support 131 is moved upwardly, the adapter nut 133 is correspondingly moved upwardly by virtue of the engagement of its flange 134 with the support 131. The pump shaft 13 is correspondingly upwardly moved.

By providing adapter nuts having threaded openings of slightly different sizes, the same detachable bracket structure may be used in connection with pump shafts of different sizes. The adapter nut 133 forms, in effect, a separable part of the support 131. In the present instance, the transverse port 136, establishing communication between the cylinder spaces on opposite sides of the bracket 131, is offset on one side of the opening 132.

The inventor claims:

1. In an adjusting mechanism for a shaft having a threaded end, a rotary means angularly movable with the shaft, and a nut carried at the threaded end supporting the shaft by resting upon said rotary means: a body having a threaded recess for detachably receiving the end of the shaft; and hydraulically motivated means cooperable with the body and engageable with the rotary means for moving the shaft axially relative to the rotary means to lift the nut away from the rotary means.

2. In an adjusting mechanism for a shaft having a threaded end, a rotary means angularly movable with the shaft, and a nut carried at the threaded end supporting the shaft by resting upon said rotary means: a body having a threaded recess for detachably receiving the end of the shaft; hydraulically motivated means cooperable with the body and engageable with the rotary means for moving the shaft axially relative to the rotary means to lift the nut away from the rotary means; and an annular fitting carried by the body and located in alignment with the axis of the recess, and serving to effect a coupling to the hydraulically motivated means.

3. In an adjusting mechanism for a shaft having a threaded end, a rotary means angularly movable with the shaft, and a nut carried at the threaded end supporting the shaft by resting upon said rotary means: a body having a threaded recess for detachably receiving the end of the shaft; and hydraulically motivated piston means carried by the body for movement in a direction parallel to the axis of said recess and engageable with the rotary means and thereby move the shaft axially relative to the rotary means to lift the nut away from the rotary means.

4. In an adjusting mechanism for a shaft having a threaded end, a rotary means angularly movable with the shaft, and a nut carried at the threaded end supporting the shaft by resting upon said rotary means: a body having a threaded recess for detachably receiving the end of the shaft; hydraulically motivated piston means carried by the body for movement in a direction parallel to the axis of said recess to engage the rotary means and thereby move the shaft axially relative to the rotary means to lift the nut away from the rotary means; and adjustable feet carried by the piston means and interposed between the piston means and the rotary means.

5. In an adjusting mechanism for a shaft having a threaded end, a rotary means angularly movable with the shaft, and a nut carried at the threaded end supporting the shaft by resting upon said rotary means: a body having a threaded recess for detachably receiving the end of the shaft; hydraulically motivated means cooperable with the body and engageable with the rotary means for moving the shaft axially relative to the rotary means to lift the nut away from the rotary means; an annular fitting carried by the body and located in alignment with the axis of the recess; passage forming means between the fitting and the hydraulically motivated means; and a pressure gauge carried by the body for determining the pressure applied to the hydraulic means.

6. In an adjusting mechanism for a shaft having a threaded end, a rotary means angularly movable with the shaft, and a nut carried at the threaded end supporting the shaft by resting upon said rotary means: a body having a threaded recess for detachably receiving the end of the shaft, said body having a pair of arms extending on opposite sides of the recess so that the nut is accessible between the arms; means forming a cylinder space at the ends of each arm; and pistons for each cylinder space and engageable with the rotary means for moving the shaft axially relative to the rotary means to lift the nut away from the rotary means.

7. In apparatus of the character described: a member having passages for hydraulic fluid; a check valve fitting carried by the member; said check valve fitting serving to pass the fluid both into and out of the passage; a cup carried by the member in surrounding relationship with respect to the fitting; and a release actuator carried by the cup for operating the fitting; said cup providing a space for collection of fluid passing outwardly of the fitting; and said cup being detachable from the fitting.

8. In an adjusting mechanism for a shaft having a threaded end, a rotary means angularly movable with the shaft, and a nut carried at the threaded end supporting the shaft by resting upon said rotary means: a body having a threaded recess for detachably receiving the end of the shaft; said body having hydraulically motivated means for lifting the nut from said rotary means; a check valve fitting, capable of detachable engagement with a grease gun or the like, carried by the body and located in alignment with said recess; passage forming means between the check valve and the hydraulically motivated means; a cup detachably carried by the body in surrounding relationship to said fitting; and a release actuator carried by the cup and extending in alignment with the fitting and the recess, and movable in the direction of alignment; said cup providing a space for collection of fluid passing outwardly of the fitting.

9. The process of adjusting the position of a shaft for a pump which has a threaded end and a thrust nut carried at said threaded end cooperable with a rotary member, which comprises: lifting the shaft while the shaft is rotating to elevate the nut from the member; observing the dynamic operating characteristics of the pump while adjusting the position of the shaft; stopping the shaft while maintaining the adjusted position of the shaft; then moving the nut to engaging position with the member; and then removing the force that lifts the shaft.

10. In apparatus of the character described: a rotary member having passages for hydraulic fluid; a check valve fitting carried by the member and located at the axis of rotation of the member; said check valve fitting serving to pass the fluid both into and out of the passage; a cup carried by the member in surrounding relationship with respect to the fitting; and a release actuator carried by the cup for operating the fitting; said cup providing a space for collection of fluid passing outwardly of the fitting; and said cup being detachable from the fitting.

11. The combination as set forth in claim 10 in which the actuator is carried by the cup in such manner that the actuator may move angularly with respect to the cup about said axis.

12. In a device for axially adjusting a vertical shaft by a nut threaded to the shaft; an element coupled to the shaft and rotated thereby, said element having a surface disposed below the nut and serving to limit downward movement of the nut; a yoke carried by the shaft and above the nut; cooperating cylinder and piston members, one of the members being carried by the yoke; the other member being engageable with the upper surface of the element; the axis of the members being parallel to the axis of the shaft; and means for admitting a fluid under pressure into the cylinder member.

13. The process of adjusting the position of a shaft for a pump which has a threaded end projecting upwardly beyond a rotary member upon which the shaft is intended to rest, and having a thrust nut carried at said threaded end, which comprises: temporarily supporting the shaft independently of the nut by interposing a hydraulic jack between the shaft and the member; observing the pressure of the hydraulic jack fluid during rotation of the shaft; adjusting the position of the shaft with reference to the observed pressure; and thereafter adjusting the nut to maintain the adjusted shaft position.

14. The process as set forth in claim 13, in which the adjusting of the shaft is accomplished during rotation.

15. The process as set forth in claim 13, in which the nut is first temporarily adjusted to a position in which the pump rotor clears the bottom of the pump casing, and so maintained during subsequent shaft adjustment.

16. In a vertical pump structure including a vertical pump shaft having a threaded upper end, a nut mounted on said threaded upper end, and a member rotatable with the shaft opposed to the nut for sustaining the down thrust on the pump shaft, the combination therewith of: a body detachably engaging the shaft at the threaded end, and hydraulic motor means carried by the body and engaging said rotary member for temporarily sustaining the thrust of the shaft independently of said nut.

17. In an adjusting mechanism for a shaft having a threaded end, a rotary means angularly movable with the shaft, and a nut carried at the threaded end supporting the shaft by resting upon said rotary means: a body having a threaded recess for detachably receiving the end of the shaft, said body having a pair of arms extending on opposite sides of the recess so that the nut is accessible between the arms; an annular piston carried at the ends of the arms; a member resting on the rotary means and providing an annular cylinder space in which the piston is received; and passage forming means for admitting fluid under pressure to the cylinder space for lifting the body and the shaft.

18. The combination as set forth in claim 1, in which said body comprises two separable parts; one of the parts having an opening; and the other of the parts being threaded for receiving the end of the shaft, and also having a flange resting upon the edges about the opening of the said one part to provide a connection between the parts; said hydraulically motivated means being cooperable with the said one body part.

19. In an adjusting mechanism for a shaft having a threaded end, and a nut carried at the end of the shaft: a coupling member connected to the shaft for rotation therewith and for axial movement with respect thereto, said member providing a surface upon which the nut may rest; said member having means forming a hydraulic cylinder space; a bracket detachably carried by the end of the shaft and having piston means cooperable with the cylinder space; and passage forming means for admitting fluid under pressure into the cylinder space for moving the bracket and the shaft to lift the nut from said surface.

References Cited in the file of this patent

UNITED STATES PATENTS

| | | |
|---|---|---|
| 2,329,569 | Weigolt | Sept. 14, 1943 |
| 2,375,882 | Anania | May 15, 1945 |
| 2,435,470 | Samelson | Feb. 3, 1948 |
| 2,508,240 | Fenn | May 16, 1950 |
| 2,539,739 | Grime | Jan. 30, 1951 |
| 2,663,339 | Verderber | Dec. 22, 1953 |
| 2,714,027 | Bouvat-Martin | July 26, 1955 |
| 2,727,526 | Nickle | Dec. 20, 1955 |
| 2,728,978 | Birkenmaier et al. | Jan. 3, 1956 |
| 2,761,649 | Woolcock | Sept. 4, 1956 |
| 2,865,299 | Hornschuch et al. | Dec. 23, 1958 |

FOREIGN PATENTS

| | | |
|---|---|---|
| 763,792 | France | Feb. 19, 1934 |